United States Patent [19]

Driemeyer

[11] 4,324,390
[45] Apr. 13, 1982

[54] APPARATUS FOR MANUFACTURING STEEL FROM IRON ORE DUST BY DIRECT REDUCTION

[75] Inventor: Manfred Driemeyer, Issum, Fed. Rep. of Germany

[73] Assignee: Mannesmann DeMag AG, Duisburg, Fed. Rep. of Germany

[21] Appl. No.: 152,348

[22] Filed: May 22, 1980

Related U.S. Application Data

[62] Division of Ser. No. 83,387, Oct. 10, 1979.

[30] Foreign Application Priority Data

Oct. 10, 1978 [DE] Fed. Rep. of Germany ....... 2844056

[51] Int. Cl.³ .......................... F27B 3/08; F27B 3/18
[52] U.S. Cl. .................................. 266/155; 266/156; 266/182; 373/80
[58] Field of Search ............... 266/182, 155, 156; 75/10, 11 B; 13/33

[56] References Cited

U.S. PATENT DOCUMENTS

| | | | |
|---|---|---|---|
| 1,459,187 | 6/1923 | Pratt | 75/40 |
| 1,662,302 | 3/1928 | Croese | 75/10 R |
| 2,782,022 | 2/1957 | Strohmeier | 266/156 |
| 2,951,756 | 9/1960 | Cavanagh | 75/40 |
| 3,140,168 | 7/1964 | Halley et al. | 75/11 |
| 3,862,834 | 1/1975 | Von Waclawiczek et al. | 75/11 |
| 3,963,483 | 6/1976 | Mathesius et al. | 75/11 |
| 3,997,333 | 12/1976 | Fex | 75/11 |
| 4,045,214 | 8/1977 | Wetzel et al. | 75/38 X |

FOREIGN PATENT DOCUMENTS

| | | | |
|---|---|---|---|
| 442776 | 4/1927 | Fed. Rep. of Germany | 75/40 |
| 1048030 | 4/1960 | Fed. Rep. of Germany | 75/40 |
| 2116445 | 2/1973 | Fed. Rep. of Germany | 75/40 |
| 2424932 | 4/1976 | Fed. Rep. of Germany | 75/40 |
| 2401909 | 8/1978 | Fed. Rep. of Germany | 75/40 |

*Primary Examiner*—M. J. Andrews
*Attorney, Agent, or Firm*—Mandeville and Schweitzer

[57] ABSTRACT

An apparatus for the manufacture of steel by direct reduction of iron ore dust comprises a single reactor vessel and a tubular reduction dust extending into the vessel to a point closely adjacent to the bottom of the vessel. The reactor vessel is provided with a source of reducing gas containing a monoxide and a predominant amount of $H_2$. Heating mechanisms for the reduction dust, the iron ore dust, the source of reducing gas and the vessel are provided. The apparatus also includes a mechanism for the recycling of heat and the components of the waste gases of the reactor vessel.

5 Claims, 1 Drawing Figure

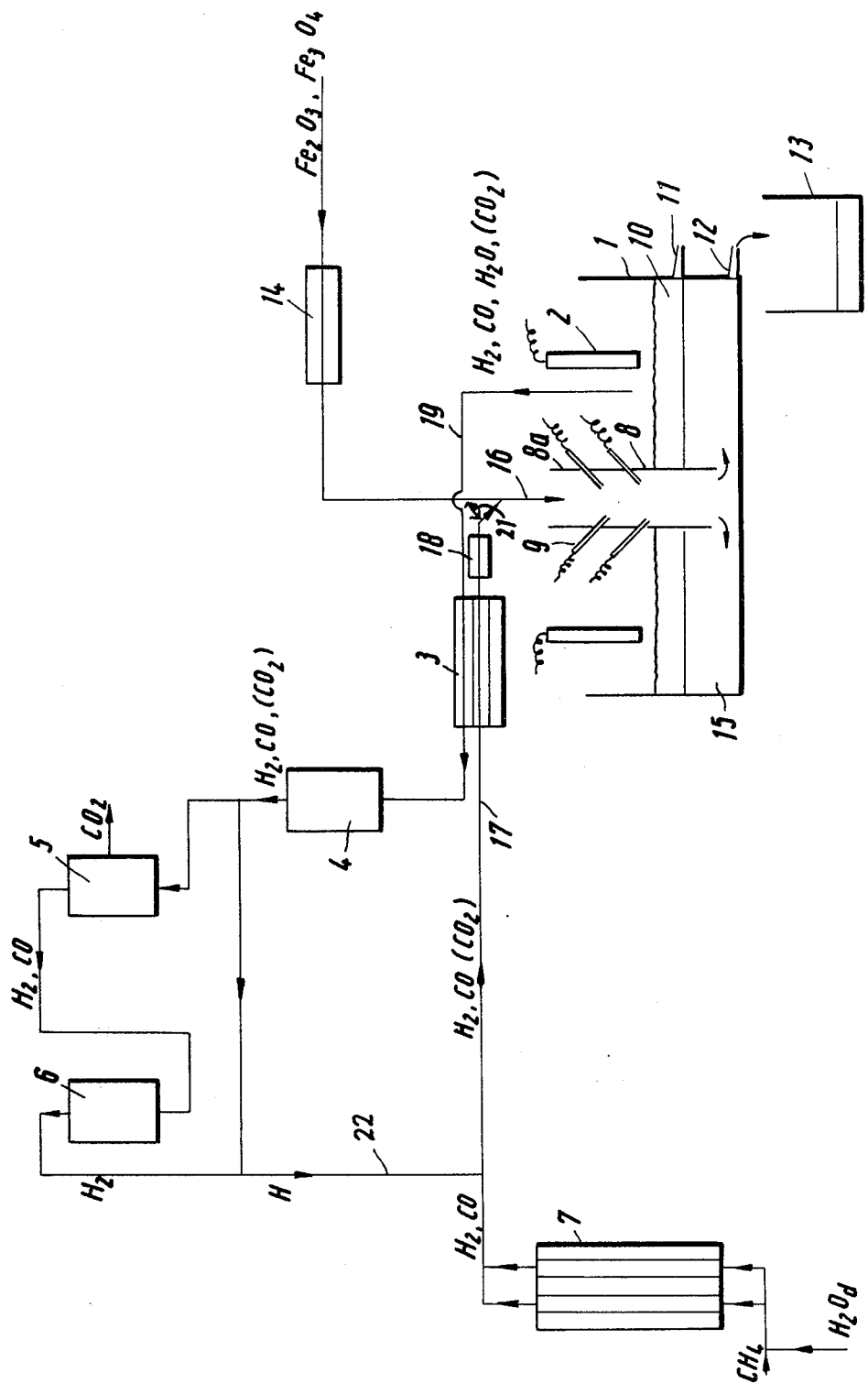

APPARATUS FOR MANUFACTURING STEEL FROM IRON ORE DUST BY DIRECT REDUCTION

This is a division of application Ser. No. 083,387, filed Oct. 10, 1979.

The invention relates to methods and apparatus for manufacturing steel from iron ore dust by direct reduction. The iron ore dust is preheated, then reduced with a gas mixture containing monoxide. Thereafter, the reduced product is charged by means of a gaseous aid or adjuvant into an iron smelt below the bath surface.

German DE-AS No. 24 01 909 discloses a method for manufacturing steel from fine-grained iron ores. In that method, the preheated and partially reduced iron ore is reduced to iron sponge in a counter-flow current with gases consisting almost exclusively of carbon monoxide in a vortex reactor at 500° to 850° C. The iron sponge is delivered pneumatically from the vortex reactor to a smelting furnace in such a way that it is charged into the iron smelt with a multiple jet cap arranged below the surface of the bath.

Three reactors are required to carry out this method. One is for pre-reduction, one for reduction (in the vortex process), as well as one for smelting. This procedure entails problems, particularly the problem of transporting the prereduced material, which has a tendency to reoxidize, as well as the risk of collapse during the direct reduction.

The present invention decreases the number of steps required in the process for direct manufacture of steel from iron ore dust by direct reduction. Furthermore, the disturbances occurring presently caused particularly by the reoxidation of the prereduced material and/or by collapsing of the material during the direct reduction, are eliminated. Another achievement of the invention is the reduction of the number of installation parts, and the simplification of transport between the individual installation parts. This is solved by the method for manufacturing steel from iron ore dust by direct reduction, whereby the iron ore dust is preheated, then reduced with a gas mixture containing monoxide and the reduction product is charged into an iron smelt below the surface of the bath, distinguished in that the iron dust is introduced into a reducing gas in a continuous current, which is preheated to about 400° to 800° C. containing predominantly $H_2$ and at the same time serving as adjuvant, and immediately upon this introduction it is delivered through a reduction duct going almost to the bottom of a smelting aggregate, whose interior is heated to 1,000° to 1,400° C., after which the metallic iron spontaneously reduced from the iron ore dust, following the delivery of the adjuvant gas current and the free fall, is transformed to the molten state in the iron smelt present in the smelting vessel. Advantageous further developments of the invention are contained in the dependent claims.

In the method of the invention, a gas mixture of about 300° C. and rich in $H_2$ is heated, recuperatively, from the waste or exhaust gas of an iron smelting aggregate to about 700° C., and fed to a reducing duct. Immediately before admitting the gas mixture into the upper portion of this reducing duct arranged in the furnace chamber of an iron smelting aggregate, microfine ground ore is added to the gas current. In the reaction duct, the lower end of which is immersed in a molten Fe metal bath, the solid-gas-mixture is heated to about 1,200° C. so that it is practically spontaneously reduced from reduction gas to metallic iron. Subsequently, the iron, following the gas current and/or the free fall, is pressed into the molten phase together with the gas mixture, where it is transformed into the molten state.

The metal bath is supplied with energy in order to avoid cooling of the molten iron by the solid-gas-mixture entering the molten phase, where the temperature is below the liquidus temperature of the iron. Furthermore, it is supplied to compensate for the temperature loss of possibly occurring tail reactions of the endothermal reduction processes taking place via hydrogen, and finally to compensate for the radiation losses of the smelt bath.

The waste gas emerging from the metal bath, consisting of the components $H_2$, $CO$, $H_2O$, $CO_2$, is immediately upon issuing from the smelting aggregate, fed to the reducing gas for recuperative heat exchange. Following that the waste gas is dried and, as a rule, fed again directly to the process. In order to balance the loss of the gas components oxidized by the reducing process, the process is to be supplied at all times with fresh, live gas, which may, for example, be supplied from natural gas and water vapor in a gas transformer. The mixed gas is mixed with the reconditioned gas from the process, recuperatively heated, mixed with iron ore dust, and fed to the reduction duct.

For this method of the invention, the usual safety measures for preventing explosions must, of course, be taken, which are required for processes where a reducing gas containing $H_2$ is used. Above all, all parts of the installation must be gas proof.

The method of the invention is distinguished by the fact that steel is manufactured from ore in one step, whereby the reducing potential of hydrogen, which is favorable for high temperatures, is utilized. There is almost no metallurgic work done in the smelting aggregate. Only a separation of the metallic iron from the oxidic matrix takes place here. The smelting aggregate is provided with two tap holes, which are located in the usual manner at different levels in order to tap metal and slag separately. Also, the method of the invention makes it possible to reduce the number of the usual stops in the process, the transport distances between the individual parts of the installation are thus shortened.

EXAMPLE

In order to manufacture one ton of iron from, e.g. hematite iron ore, 1,430 tons of $Fe_2O_3$ and 602 $Nm^3$ (normal cubic meters) $H_2$ are required. With reference to the reduction temperature of 1,200° C., one ton Fe requires 3,250 $Nm^3$ $H_2$. To manufacture, for example 30 (tons) Fe, with reference to a reduction temperature of 1,200° C., 97,500 $m^3 H_2$ are required for the reduction of $Fe_2O_3$ to metallic iron. The theoretic thermodynamic efficiency of the reduction of iron ores to metallic iron by means of $H_2$ at 1,200° C. amount to $\eta$ theor. $H_2$, 1,200° C. $=0.43$. Thus, only 43% of the hydrogen present may be utilized in the reduction to metallic iron, in the most favorable case. At an efficiency of $\eta$ theor., $H_2$, 1,200° C. $=0.30$ 325,000 $m^3$ of $H_2$ were required to manufacture 30 t Fe from $Fe_2O_3$ at 1,200° C. This corresponds to a gas quantity of 60,235 of $Nm^3$ of $H_2$, with reference to the standard.

At a gas utilization rate of $\eta$ theor., $H_2$, 1,200° C. $=0.30$, then 70%, or 42,000 $Nm^3$ $H_2$ were processed in a cycle. Accordingly, approximately 18,000 $Nm^3 H_2/$30 t Fe had to be freshly fed to the process, making up the design data for the gas transformer, together with the output of the smelting aggregate. In the gas transformer, natural gas and water vapor were converted into the reducible components $H_2$ and CO, according to the conversion reaction $CH_2 + H_2O_2 = 3 H_2 + CO$.

The freshly produced reducing gas, therefore, consists of three volume parts $H_2$ and one volume part CO. Since the fresh gas share makes up approximately 30% of the total gas volume, the share of CO of the total gas volume computes to 7.5%. The thermodynamic efficiency of the reduction of iron oxides via the CO phase is considerably less at a temperature of 1,200° C., than via the $H_2$ phase $\eta$ (theor., CO, 1,200° C.=0.22). Due to the low share of CO gas in the total reducing gas (approx. 7.5%), the high efficiency of the reducing gas at a reduction temperature of about 1,200° C. was hardly affixed.

By repeated use of 70% of the total gas volume, the gas gradually became enriched with CO and $CO_2$. It was therefore necessary to subject the reconditioned gas after another gas cycle to a $CO/CO_2$ bath in order to obtain the loose reduction potential of the gas.

The method of the invention is explained in detail by means of the drawing which represents, schematically, an example of the apparatus to carry out the method.

The direct reduction of the ore dust takes place in a solid-gas-flow reactor formed by a tubular reduction duct 8 penetrating into a smelting aggregate (light arc furance 1) and almost touching the bottom of the light arc furnace. The lower end of duct 8 is immersed in the molten iron bath 15. The duct 8 is provided with a refractory lining, and is heated to about 1,000° to 1,400° C. by means of electrodes 9 arranged in the duct wall and protruding into the duct 8. In the upper area 8a of the duct 8, a conduit 16, which runs vertically in the last section, empties into the duct 8 for the delivery of iron ore dust.

In the vertical section of conduit 16 above the reduction duct 8 a conduit 17 discharges the reducing gas, at an acute angle 21. Just before the discharge point, a gas compressor 18 is provided in conduit 17 for delivering the reducing gas through the last section of conduit 17 and/or 16. The ore dust moving in free fall through the vertical section of conduit 16 is added to the gas current so that the solid, as well as the gaseous phase, enter the reduction duct 8 in a continuous current.

The iron ore is reduced substantially spontaneously here to metallic iron at a temperature of about 1,200° C. Subsequentially, following the gas current and/or free fall, the iron is pressed together with the gas mixture into the molten phase 15 present at the bottom of the vessel where it is transformed into the molten state. The metal bath 15 is supplied with energy via electrodes 2 in order to avoid, above all, any cooling of the molten iron by the solid-gas mixture entering the molten phase, whose temperature is below the liquidus or melting point temperature of the iron. Furthermore, the energy supply balances the temperature loss of possibly occurring tail reactions of the reducing processes taking place via $H_2$. Finally, the energy supply compensates for the radiation losses of the smelting bath.

There is a slag layer 10 in the light arc furnace 1 above the smelting bath 15. In the area of the slag layer 10, there is a slag tap hole 11. In the area of the smelting bath 15, a metal tap hole 12 is provided. The metallic iron is tapped into a ladle 13 to which may be added carbon carriers and/or alloying elements, as required.

The iron ore ($Fe_2O_3$, $Fe_3O_4$) is ground microfine in the ore mill 14 and—as already described, delivered into the reduction duct through conduit 16.

The following gas cycle is provided for the installation: The spent gas emerging from the light arc furnace 1 consisting of the components $H_2$, CO, $H_2O$ and $CO_2$ which is conducted through conduit 19, is conveyed to the reducing gas for recuperative heat exchange in the recuperator 3 immediately upon leaving the furnace 1. Subsequently, the waste gas is dried in the drier 4 and, as a rule, returned to the reduction process. The gas which has been slowly enriched with CO and $CO_2$ is subjected to a bath in a $CO_2$ washer 5, as well as in a CO washer 6 in order to obtain the reduction potential of the gas. In order to compensate for the loss of the gas components oxidized through the reduction process, the process is supplied at all times with fresh gas which is secured in a gas transformer 7 from natural gas and water vapor. The fresh gas is mixed with the reconditioned gas from the process in duct 22, heated in the recuperator 3, mixed with iron ore dust fed into the reduction duct 8.

I claim:

1. An apparatus for manufacturing steel by direct reduction of iron ore dust, comprising
   (a) a single reactor vessel capable of containing both a smelting aggregate and a slag layer;
   (b) said reactor vessel having a first heating means to maintain said smelting aggregage in the molten state;
   (c) a metal tap located in the lower portion of said vessel for tapping said smelting aggregate;
   (d) a slag tap located above said metal tap for tapping said slag layer;
   (e) a tubular reduction duct vertically disposed in said reactor vessel, said reduction duct extending downwardly into said smelting aggregate below the surface layer of said smelting aggregate and to a point closely adjacent the bottom of said reactor vessel;
   (f) a first feeding means for providing a reducing gas mixture containing a monoxide and predominantly $H_2$ to said tubular reduction duct;
   (g) a second heating means for heating said first feeding means and said gas mixture provided thereby;
   (h) a third heating means for preheating iron ore dust to a temperaure in the range of about 400° to 800° C.;
   (i) a second feeding means for providing said preheated iron ore dust to said tubular reduction duct and for mixing said preheated iron ore dust with said gas mixture;
   (j) a fourth heating means for heating said tubular reduction duct to a temperature within the range of about 1000° to 1400° C. to thereby utilize the high reduction potential of $H_2$ of the gas mixture which is present at said temperature range, and;
   (k) means for recovering and recycling the heat and components of waste gases of said reactor vessel.

2. An apparatus for manufacturing steel as claimed in claim 1, wherein said first feeding means is a fluid conduit angularly disposed with respect to the vertical axis of said tubular reduction duct.

3. An apparatus for manufacturing steel as claimed in claim 1, wherein said heating means is electrical.

4. An apparatus for manufacturing steel as claimed in claim 1, wherein said tubular reduction duct is provided with a refractory lining.

5. An apparatus for manufacturing steel as claimed in claim 3, wherein said electrical heating means includes a plurality of spaced electrodes disposed in the wall of said tubular reduction duct and extending through the wall of said tubular reduction duct.

* * * * *